United States Patent
Zhang

(10) Patent No.: US 12,328,042 B2
(45) Date of Patent: Jun. 10, 2025

(54) VARNISH APPLICATION SYSTEM FOR ELECTRIC MOTOR

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 18/150,285

(22) Filed: Jan. 5, 2023

(65) Prior Publication Data

US 2024/0235345 A1    Jul. 11, 2024

(51) Int. Cl.
*H02K 1/04* (2006.01)
*H02K 1/16* (2006.01)
*H02K 3/48* (2006.01)
*H02K 15/10* (2006.01)
*H02K 15/12* (2006.01)

(52) U.S. Cl.
CPC ............... *H02K 15/12* (2013.01); *H02K 1/04* (2013.01); *H02K 1/165* (2013.01); *H02K 3/48* (2013.01); *H02K 15/105* (2013.01)

(58) Field of Classification Search
CPC ............ H02K 1/16; H02K 3/30; H02K 3/345; H02K 15/12; H02K 9/193; H02K 1/20
See application file for complete search history.

(56) References Cited

U.S. PATENT DOCUMENTS

| | | | |
|---|---|---|---|
| 8,203,251 B2 | 6/2012 | Ishizuka et al. | |
| 10,063,118 B2 | 8/2018 | Yoshida et al. | |
| 10,658,884 B2 | 5/2020 | Honjo | |
| 11,799,368 B2 | 10/2023 | Zhang | |
| 2011/0260572 A1* | 10/2011 | Hiraga | H02K 15/068 310/215 |
| 2013/0095232 A1* | 4/2013 | Kaiser | H02K 15/12 427/104 |
| 2015/0001984 A1* | 1/2015 | Bradfield | H02K 1/165 310/216.069 |
| 2022/0094248 A1 | 3/2022 | Kobayashi et al. | |

FOREIGN PATENT DOCUMENTS

| | | |
|---|---|---|
| JP | 2011139588 | 7/2011 |
| JP | 4973420 | 7/2012 |
| JP | 2016059227 | 4/2016 |
| JP | 6225624 | 11/2017 |
| JP | 2020150611 | 9/2020 |
| WO | 2022128632 | 6/2022 |

* cited by examiner

*Primary Examiner* — Leda T Pham
(74) *Attorney, Agent, or Firm* — Burris Law, PLLC

(57) ABSTRACT

A varnish injection system for an electric motor includes a pair of varnish injection assemblies and a biasing device. Each varnish injection assembly includes an injector arm and a varnish injector nozzle attached to the injector arm and operable to provide a varnish to a gap defined between the stator core and one or more wires among the plurality of wires. The biasing device connects the pair of varnish injection assemblies and is configured to exert a compressive force urging the pair of varnish injection assemblies toward each other.

20 Claims, 6 Drawing Sheets

VARNISH APPLICATION SYSTEM FOR ELECTRIC MOTOR

FIELD

The present disclosure relates to electric motors, and more particularly to maintenance of electric motor components.

BACKGROUND

The statements in this section merely provide background information related to the present disclosure and may not constitute prior art.

Electric propulsion systems in vehicles use electric motors to propel the vehicle as an alternative or in addition to internal combustion engines. Generally, varnish is applied to the electric motors to protect against corrosion and contaminant, thereby improving an operation life of the electric propulsion system. The varnish can be applied with a machine designed to apply the varnish to various components of the motors. During application, varnish may flow away from an intended location or component that uses the varnish, increasing the total amount of varnish used and potentially disrupting operation of other parts of the electric motor.

The present disclosure addresses challenges related to varnish application to electric motors.

SUMMARY

This section provides a general summary of the disclosure and is not a comprehensive disclosure of its full scope or all of its features.

In one form, a varnish injection system for an electric motor having a stator core and a plurality of wires arranged in and connected to the stator core includes a pair of varnish injection assemblies and a biasing device. Each varnish injection assembly includes an injector arm and a varnish injector nozzle attached to the injector arm and is operable to provide a varnish to a gap defined between the stator core and one or more wires among the plurality of wires. The biasing device connects the pair of varnish injection assemblies and is configured to exert a compressive force urging the pair of varnish injection assemblies toward each other.

In variations of the system, which may be implemented individually or in combination: each varnish injection assembly of the pair of varnish injection assemblies further includes a second varnish injector nozzle supported by the injector arm, wherein the second varnish injector nozzle is arranged adjacent to the varnish injector nozzle; for at least one of the varnish injection assemblies from the pair of varnish injection assemblies, the varnish injector nozzle and the second varnish injector nozzle are arranged relative to one another to have the varnish injector nozzle provide varnish at a first portion of the gap and the second varnish injector nozzle provide varnish at a second portion of the gap different from the first portion of the gap; each varnish injection assembly further comprises a nub disposed over an end of the injector arm and configured to contact the stator core; each nub is formed of a resiliently deformable material; each nub has a length, the length determined to position each varnish injector nozzle at a specified distance from the gap when the nub contacts the stator core; the biasing device is configured to urge each nub onto the stator core; for at least one varnish injection assembly from among the pair of varnish injection assemblies, the varnish injector nozzle and the injector arm are arranged relative to each one other to define an acute angle; further including a varnish supply and a varnish pump, the varnish supply fluidly connected to the varnish pump and the varnish pump fluidly connected to the varnish injector nozzles; the injector arms are formed of a resilient material configured to elastically deform upon urging by the biasing device; the biasing device comprises a first end connected to the injector arm of one of the varnish injection assemblies and a second end connected to the injector arm of the other of the varnish injection assemblies; a first one of the pair of varnish injection assemblies is disposed on a first side of the stator core and a second one of the pair of varnish injection assemblies is disposed on an opposing second side of the stator core.

A stator for an electric motor includes a stator core defining a slot, a wire disposed in the slot, and an insulating layer disposed in the slot between the stator core and the wire. The insulating layer includes a rectangular portion adjacent to the stator core and a pair of trapezoidal intermediate portions extending away from the rectangular portion. The pair of trapezoidal intermediate portions extend out from the slot with the wire.

In variations of the stator, which may be implemented individually or in combination: the trapezoidal intermediate portions extend continuously across the wire beneath a varnish nozzle disposed outside of the slot to direct varnish deposited by the varnish nozzle through the slot; the insulating layer defines a first gap with the stator core and a second gap with the wire.

A motor assembly includes a stator of an electric motor and a varnish injection system. The stator includes a stator core defining a slot, a wire disposed in the slot, and an insulating layer disposed between the stator core and the wire. The insulating layer includes a rectangular portion adjacent to the stator core and a pair of trapezoidal intermediate portions extending away from the rectangular portion, wherein the trapezoidal intermediate portions extend out from the slot with the wire. The stator core and the insulating layer define a first gap therebetween and the wire and the insulating layer define a second gap therebetween. The varnish injection system includes a pair of varnish injection assemblies disposed on opposing sides of the stator core and a biasing device. Each varnish injection assembly includes an injector arm, a varnish injector nozzle attached to the injector arm and operable to provide a varnish to one of the first gap and the second gap, and a varnish supply fluidly connected to the varnish injector nozzle. The biasing device connects the pair of varnish injection assemblies and configured to exert a compressive force urging the pair of varnish injection assemblies toward each other.

In variations of the assembly, which may be implemented individually or in combination: each varnish injection assembly of the pair of varnish injection assemblies further comprises a second varnish injector nozzle supported by the injector arm, the second varnish injector nozzle is arranged adjacent to the varnish injector nozzle, for at least one of the varnish injection assemblies from the pair of varnish injection assemblies, the varnish injector nozzle and the second varnish injector nozzle are arranged relative to one another to have the varnish injector nozzle provide varnish at the first gap and the second varnish injector nozzle provide varnish at the second gap; the insulating layer is disposed between the varnish injector nozzle and the second varnish injector nozzle of at least one of the varnish injection assemblies; each varnish injection assembly further comprises a nub disposed over an end of the injector arm and configured to contact the stator core; the nubs are configured to urge the injector arms upon engaging deviations on a surface of the stator core.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
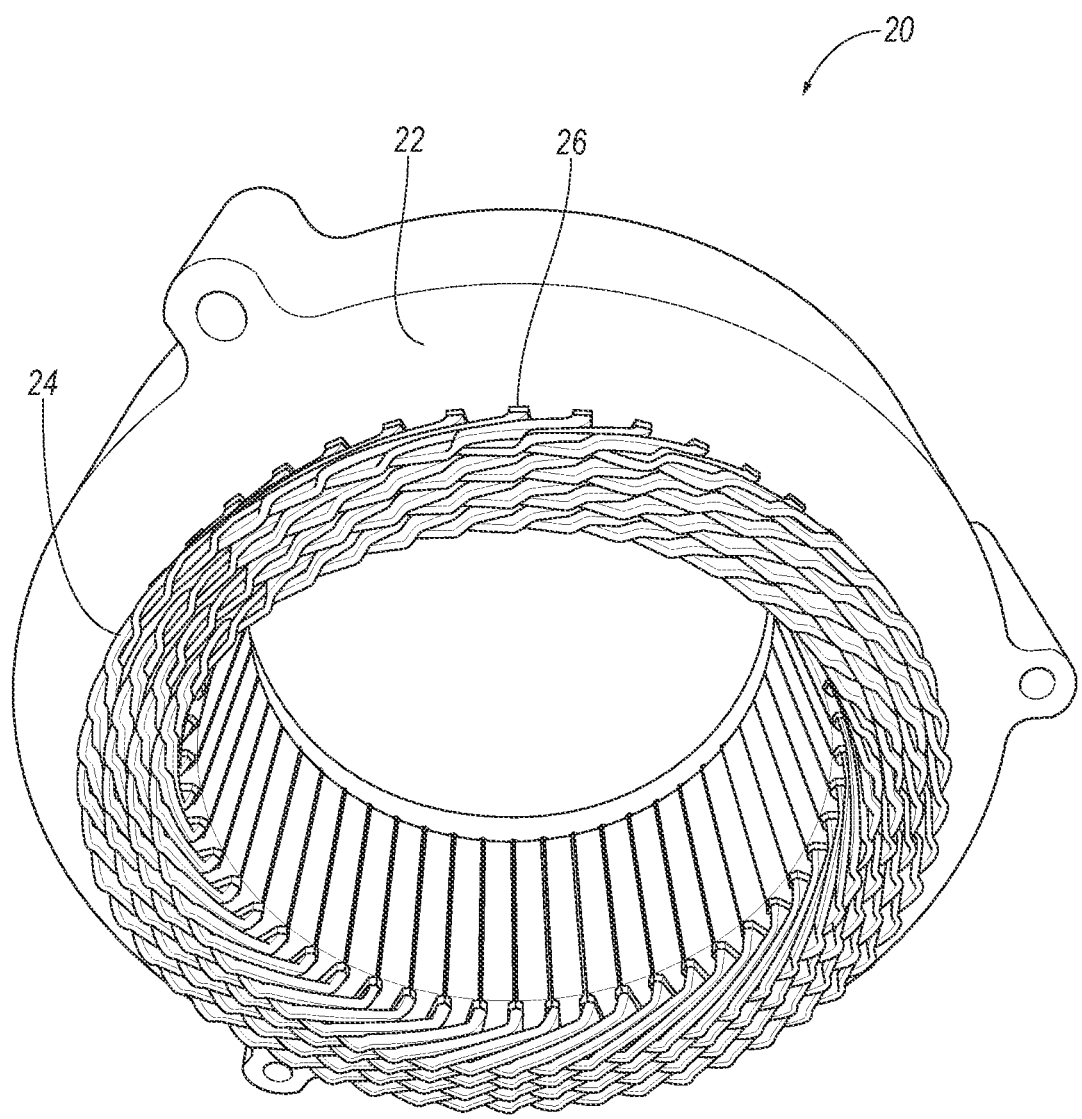
FIG. 1 is a perspective view of a stator for an electric motor according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Among other components, an electric motor includes a stator that is a stationary component generating an electromagnetic field and a rotor which rotates relative to the stator due to the electromagnetic field. The electric motor is a component of an electric propulsion for a motor vehicle such as an "electric vehicle." The electric motor propels the motor vehicle by rotating one or more wheels of the motor vehicle. In one example, the electric motor is a sole propulsion of the vehicle, such as in a fully electric vehicle. Alternatively, the electric motor can be part of a hybrid propulsion that includes an internal combustion engine, such as in a hybrid-electric vehicle.

With reference to FIG. 1, an example of a stator 20 for an electric motor is illustrated and includes a stator core 22 and a plurality of wires 24. In one form, the stator core 22 defines a plurality of slots 26, and one or more wires 24 from among the plurality of wires 24 reside in each slot 26. The wires 24 are formed of an electrically conducting material, such as copper. With the wires 24 arranged in the slots 26, electric current flow through the wire 24 generates an electromagnetic field that drives the rotor.

To inhibit corrosion or deterioration of electrical properties of the wires and to improve durability of the stator by holding stator laminates and/or copper wires and/or intermediate paper layers together in a generally rigid manner, a varnish (not shown) is applied to the stator during assembly of the electric motor. The varnish is typically applied to an outermost surface of the stator core 22 with a varnish injector with an injector nozzle, described in greater detail below, and capillary action directs the flow of the varnish through the slot 26 and onto the wires 24 as well as into a gap between a surface of the slot 26 and the intermediate paper layer (not shown). Specifically, the varnish flows in narrow spaces (i.e., capillaries), such as the slot 26, by adhesion, viscosity, and/or surface tension with the slot 26 without significant influence by, or even against, the force of gravity. In some applications, the stator core 22 is rotated such that a varnish injector applying the varnish can inject the varnish to each of the slots 26 and the wires 24 therein. When applying varnish to the stator core 22, excess varnish spreading away from the slot 26 may interfere with other parts of the stator 20, potentially inhibiting operation thereof, and increases a total amount of varnish needed for the stator core 22. Controlling flow of varnish into the slots 26 reduces a total amount of varnish used and improves manufacturing of the electric motor.

Figure 2:
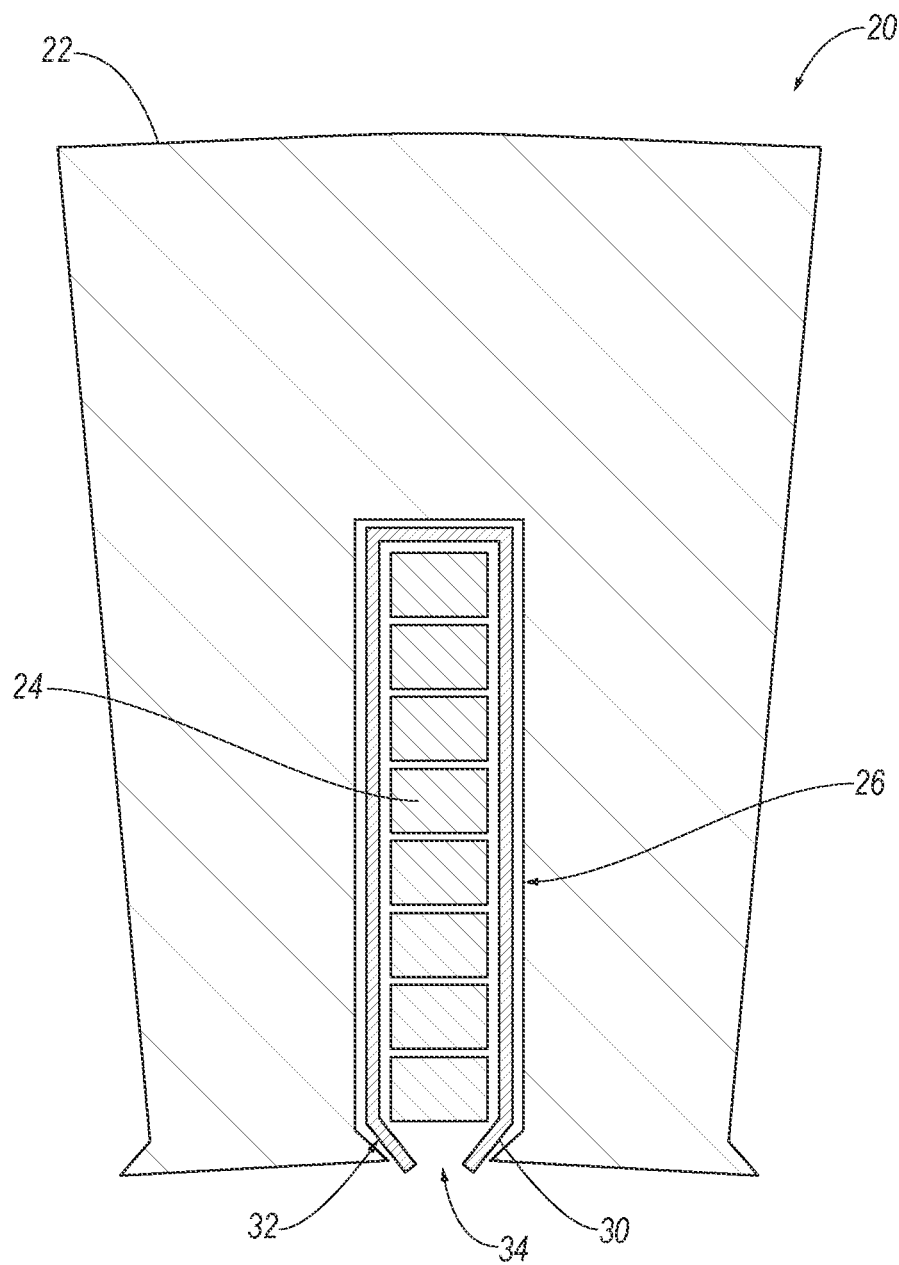
FIG. 2 is a cross-sectional view of one of the slots of the stator of FIG. 1.

With reference to FIG. 2, a partial cross-section illustrating one of the slots 26 of the stator core 22 is shown. As described above, one or more wires 24 among the plurality of wires 24 are disposed in the slot 26 defined in the stator core 22. An insulating layer 30 is disposed in the slot 26 between the wires and the stator core 22. The insulating layer 30 in this form is a paper or other porous and/or fibrous material that absorbs and transmits varnish through the fibers of the material. The insulating layer 30 extends around the wires 24 and axially through the slot 26, separating the wires 24 from direct contact with the stator core 22. The insulating layer 30 is arranged in the slot 26 such that the insulating layer 30 defines a first gap 32 with the stator core 22 and a second gap 34 with the wires 24. Applying varnish to both of the first and second gaps 32, 34 may be difficult because the varnish injector typically applies varnish vertically onto the insulating layer 30 and/or the wires 24. Capillary action from the vertical varnish flow may result in less varnish flow through one of the first and second gaps 32, 34 than the other, and additional varnish may need to be applied to adequately penetrate through the slot 26.

Figure 3:
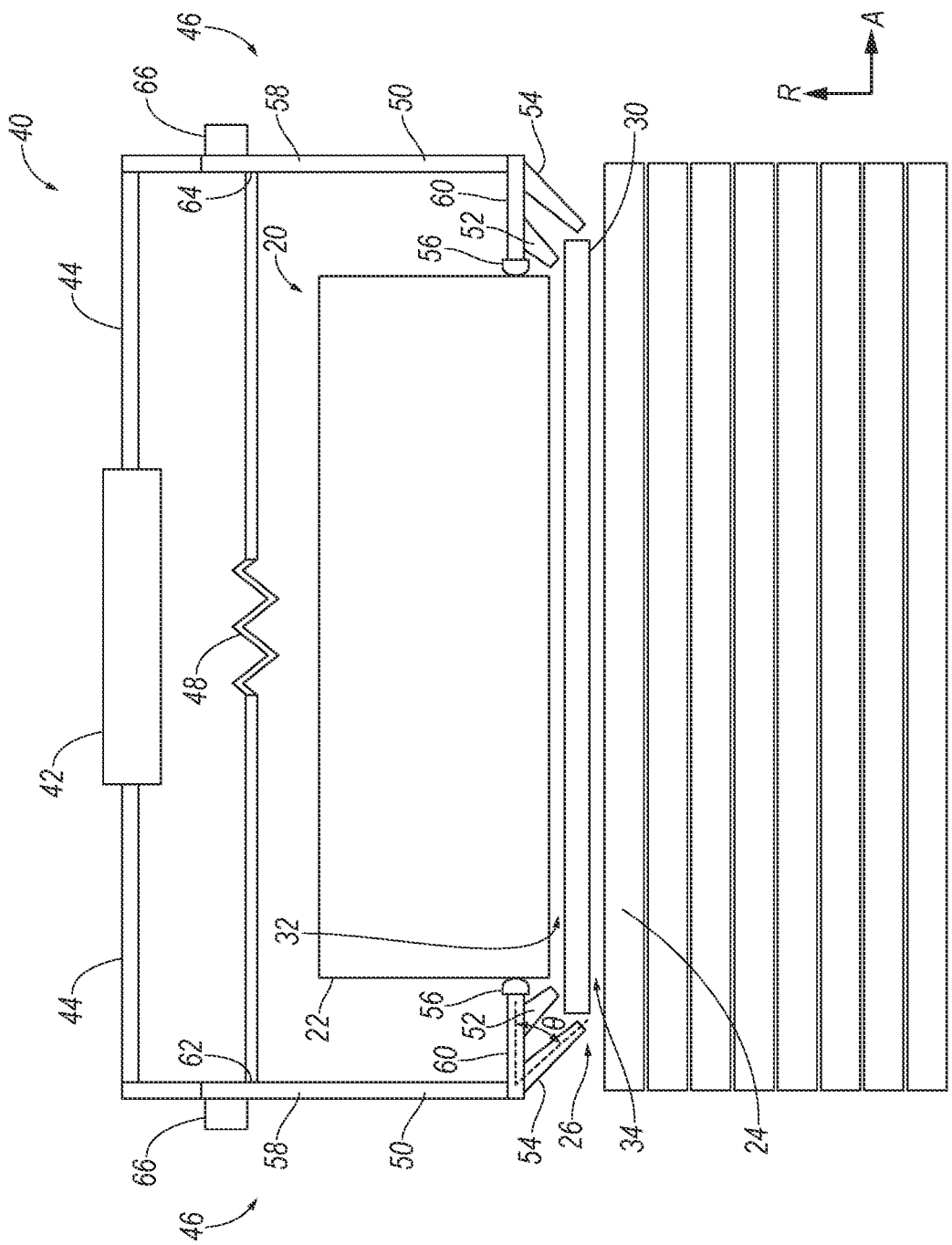
FIG. 3 is a side view of a varnish injection system according to the present disclosure.

Now referring to FIG. 3, a varnish injection system 40 for an electric motor includes a varnish pump 42, a varnish supply 44 fluidly connected to the varnish pump 42, a pair of varnish injection assemblies 46, and a biasing device 48 connecting the pair of varnish injection assemblies 46. The varnish pump 42 provides varnish from a varnish reservoir (not shown) to the varnish supply 44, and the varnish injection assemblies 46 provide the varnish from the varnish supply 42 to the slots 26. The biasing device 48 urges the varnish injection assemblies 46 against opposing sides of the stator core 22, aligning the varnish injection assemblies 46 to the gaps 32, 34 to provide the varnish to the slots 26. Thus, the varnish injection system 40 provides varnish to both the first and second gaps 32, 34, improving varnish penetration into the stator core 22 and reducing a total amount of varnish used for the stator 20.

In one form, the varnish supply 44 includes a plurality of flexible tubes through which the varnish flows from the varnish pump 42 to the varnish injection assemblies 46. Flexible tubes allow the varnish pump 42 to be positioned away from the stator core 22 and allow for movement of the varnish pump 42 and/or the varnish injection assemblies 46. In another form, the varnish supply 44 includes one or more rigid metal tubes fluidly connecting the varnish pump 42 to the varnish injection assemblies 46. Rigid tubes provide additional structure to the varnish injection system 40 and may be easier to connect to the varnish injection assemblies 46 than flexible tubes. In this form, the varnish supply 44 includes opposing tubes, each of the opposing tubes is fluidly connected to one of the varnish injection assemblies 46. In another form, the varnish supply 44 includes a single tube connected to the varnish pump 42 that has two outlets, each of the outlets connected to one of the varnish injection assemblies 46. Each varnish injection assembly 46 receives varnish from the varnish supply 44 and provides the varnish to the slots 26. In yet another form, the varnish supply 44 may include a combination of flexible and rigid tubes for fluidly connecting the varnish pump 42 to the varnish inject assembly 46.

In one form, each varnish injection assembly 46 includes an injector arm 50, a first injector nozzle 52 attached to the injector arm 50, a second injector nozzle 54 attached to the injector arm 50, and a nub 56 disposed over an end of the injector arm 50. One of the varnish injection assemblies 46 is disposed on a first side of the stator core 22, and the other of the varnish injection assemblies 46 is disposed on an opposing second side of the stator core 22. By positioning two varnish injection assemblies 46 on opposing axial sides of the stator core 22, varnish is applied to the opposing sides simultaneously, improving varnish penetration though the slots 26.

The injector arm 50 positions the varnish injector nozzles 52, 54 adjacent the slot 26 and provides varnish from the varnish supply 44 to the varnish injector nozzles 52, 54. More specifically, the injector arm 50 is a resilient hollow structure, such but not limited to, a conduit, that fluidly connects the varnish supply 44 to the varnish injector nozzles 52, 54 and physically supports the varnish injector nozzles 52, 54 to align the nozzles 52, 54 at specified locations on the stator core 22. The injector arms 50 each include a radial portion 58 extending along a radial direction R of the stator core 22 and an axial portion 60 extending along an axial direction A of the stator core. The radial portion 58 of the injector arms 50 is connected to the varnish supply 44, and the axial portion 60 of the injector arms 50 supports the varnish injector nozzles 52, 54. The radial portion 58 of the injector arm 50 is sized to a specified length to reach the slots 26 of the stator core 22 and to position the varnish injector nozzles 52, 54 adjacent to the gaps 32, 34. The axial portion 58 of the injector arm 50 is sized to a specified length to position the injector nozzles 52, 54 adjacent the wires 24 in the slot 26. In one form, the injector arms 50 are formed of a resilient material configured to elastically deform upon urging by the biasing device 48. For example, the resilient material may be, but is not limited to, aluminum.

The varnish injector nozzles 52, 54 provide varnish to the wires 24 in each slot 26. That is, the varnish pump 42 is fluidly connected to the varnish injector nozzles 52, 54 via the varnish supply 44, and the varnish injector nozzles 52, 54 apply the varnish from the varnish supply 44 to the wires 24. In the form shown, the varnish injector nozzles 52, 54 are positioned to provide varnish to specific gaps. More specifically, the first varnish injector nozzle 52 is positioned proximal to the stator core 22 to provide varnish to the first gap 32 between the slot 26 and the insulating layer 30. The second varnish injector nozzle 54 is disposed adjacent to the first varnish injector nozzle 52 and positioned to provide varnish to the second gap 34 between the insulating layer 30 and the wires 24. That is, the insulating layer 30 is disposed between the first varnish injector nozzle 52 and the second varnish injector nozzle 54 of at least one of the varnish injection assemblies 46 so that the varnish injector nozzles 52, 54 can provide varnish to both gaps 32, 34 simultaneously. In one form, at least one of the first varnish injector nozzle 52 and the second varnish injector nozzle 54 define an acute angle θ with the axial portion 60 of the injector arm 50. The acute angle θ is determined such that the first varnish injector nozzle 52, and the second varnish injector nozzle 54 apply varnish to their respective gap 32, 34, as described above. In another form not shown, the first and second varnish injector nozzles 52, 54 are substantially parallel or substantially perpendicular to the axial portion 60 of the injector arm 50.

Each varnish injection assembly 46 further includes a nub 56 disposed over an end of the injector arm 50. Specifically, the nub 56 is a rounded object configured to contact the stator core 22, holding the injector arm 50 at a specified position as the stator core 22 rotates. More specifically, the outermost laminate of the stator core 22 may have uneven outer surfaces that cause deviations from the stacking tolerances of the uneven surfaces. The deviations can interfere with varnish flow from the varnish injector nozzles 52, 54, such as by contacting the varnish injector nozzle 52, 54 directly or disrupting a stream of varnish. The nub 56 holds the varnish injector nozzles 52, 54 away from the stator core 22, acting as a spacer to avoid this interference. Specifically, the nub 56 contacts the surface of the stator core 22 upon urging by the biasing device 48, holding the varnish injector nozzles 52, 54 at a specified distance (such as 2 mm) from the gaps 32, 34 to inhibit interference of the varnish stream. In order to position the varnish injector nozzles 52, 54, the nub 56 is formed of a resiliently deformable material of a specified length that is determined to position each varnish injector nozzle 52, 54 at the specified distance when the nub 56 contacts the stator core 22. As the stator core 22 rotates, the nub 56 resiliently deforms upon engaging the deviations, urging the injector arm 50 away from the stator core 22. The urging of the injector arm 50 positions the varnish injector nozzles 52, 54 at the specified distance to provide varnish to the first and second gaps 32, 34.

The biasing device 48 urges the varnish injection assemblies 46 toward each other, holding the nubs 56 against the stator core 22. The biasing device 48 has a first end 62 connected to the injector arm 50 of one of the varnish injection assemblies 46 and a second end 64 connected to the injector arm 50 of the other of the varnish injection assemblies 46. The tension in the biasing device 48 exerts a compressive force urging the pair of varnish injection assemblies 46 toward each other and urging the nubs 56 onto the surface of the stator core 22. Then, as the stator core 22 rotates and the nubs 56 engage the deviations, the nubs 56 urge the injection arms 50 away from the stator core 22, increasing tension in the biasing device 48. Thus, the outward force applied to the nubs 56 by the deviations in the stator core 22 and the compressive force of the biasing device 48 maintain the nubs 56 against the surface of the stator core 22, maintaining the positions of the varnish injector nozzles 52, 54 to provide varnish to the first and second gaps 32, 34. In one form, the biasing device 48 is a coil spring, and the biasing device 48 can be any suitable device that urges the varnish injection assemblies 46 toward each other.

In one form, the varnish injection system 40 includes a support 66 that connects the varnish injection assemblies 46. More specifically, the support 66 is a fixture or the like that secures the varnish injection assemblies 46 to each other such that the varnish injection assemblies 46 can be moved as a unit. That is, the support 66 allows the varnish injection assemblies 46 to be moved together along the stator core 22 or to another stator 20 entirely. In particular, the support 66 positions the varnish injection assemblies 46 at substantially the same radial distance from the wires 24, with little to no difference in the radial distance between the varnish injection assemblies 46. Because the radial distance between the varnish injection assemblies 46 is negligible, the biasing device 48 urges the varnish injection assemblies 46 substantially in the axial direction.

Figure 4:
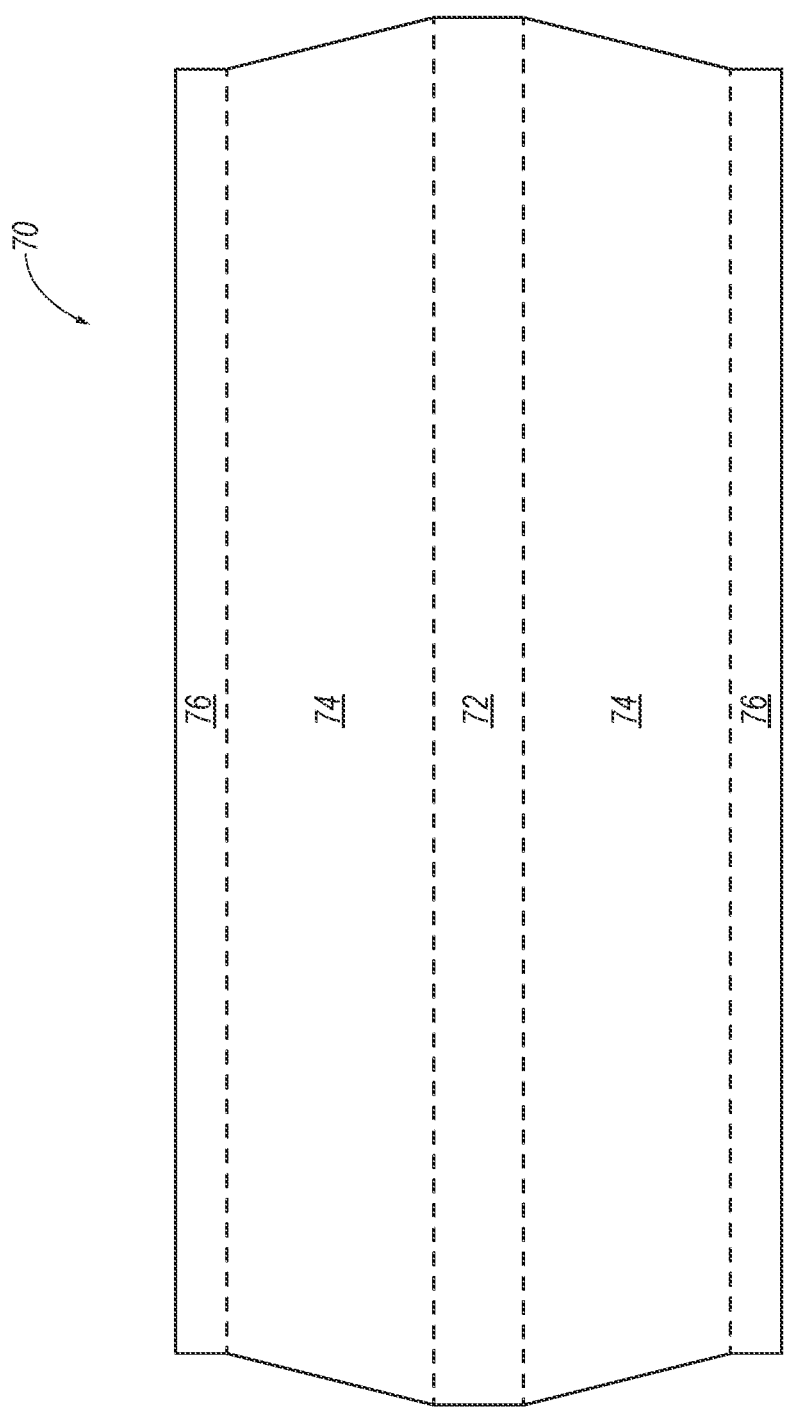
FIG. 4 is a view of an insulating layer for a stator core according to the present disclosure.

Now referring to FIG. 4, another form of the insulating layer 70 is shown. Rather than a conventional rectangularly-shaped insulating layer, such as the insulating layer 30 shown in FIGS. 2-3, the insulating layer 70 includes portions that are shaped to increase varnish penetration through the slot 26. Specifically, the insulating layer 70 includes a rectangular portion 72, a pair of trapezoidal intermediate portions 74 extending away from the rectangular portion, and a pair of distal portions 76 extending away from the intermediate portions 74. The insulating layer 70 is shaped such that, when disposed in the slot 26, the rectangular portion 72 is adjacent to the stator core 22 and the trapezoidal portions 74 extend out of the slot 26 along the wires 24. The trapezoidal portions 74 are arranged to collect varnish deposited by a varnish injector (described below) and to direct the varnish into the slot 26. The distal portions 76 of the insulating layer 70 extend below a distal one of the wires 24 opposite the stator core 22, which receive varnish that flows past the wires 24.

Figure 5:
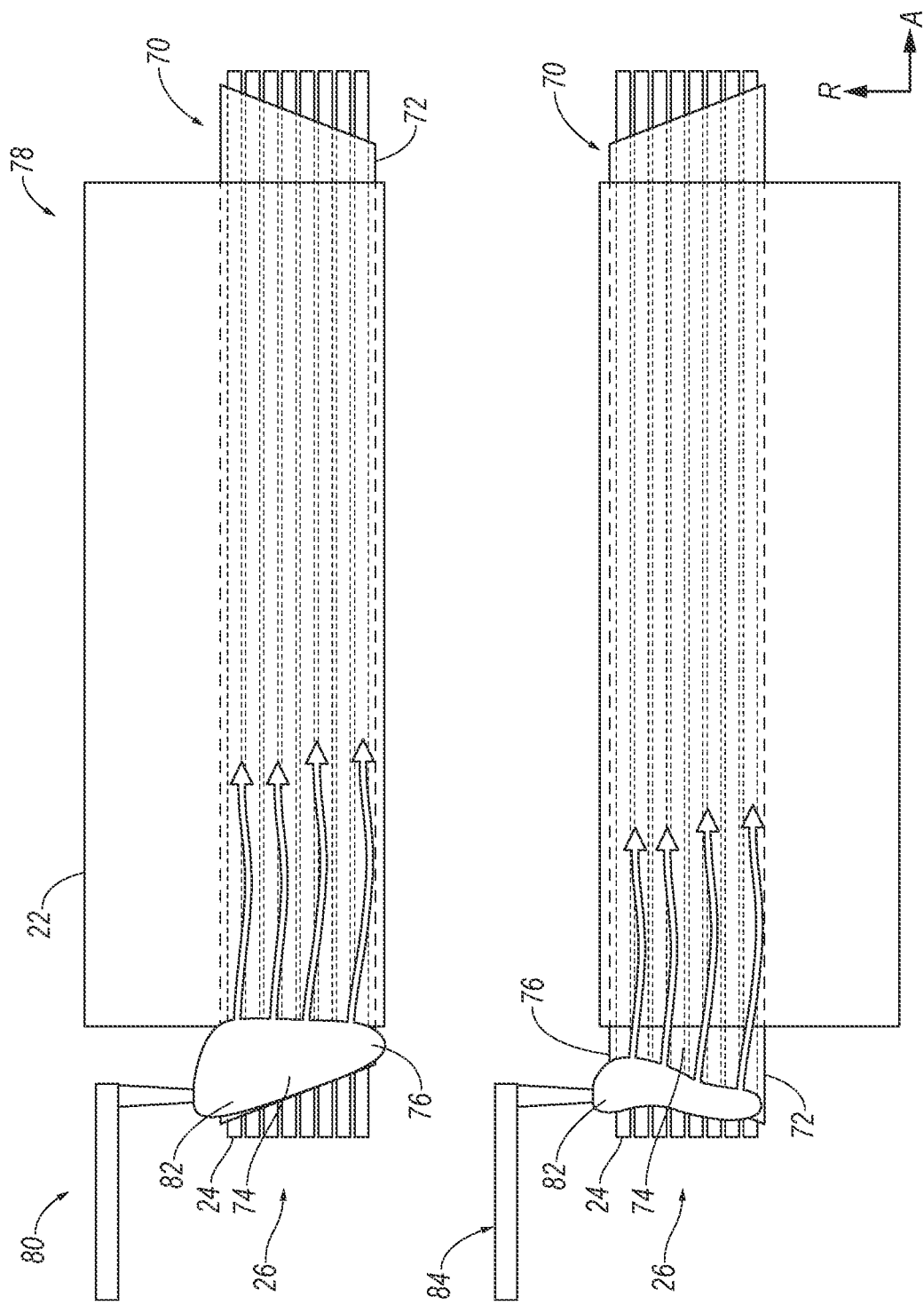
FIG. 5 is a view of a varnish injector applying varnish to the insulating layer of FIG. 4.

With reference to FIG. 5, another form of the stator 78 is shown that includes the insulating layer 70. In this form, a first varnish injector 80 applies varnish 82 to the rectangular portion 72 of the insulating layer 70 adjacent an outermost wire 24, and a second varnish injector 84 applies varnish 82 to the distal portions 76 of the insulating layer 70 adjacent an innermost wire 24. As the first varnish injector 80 applies the varnish 82 to the rectangular portion 72, the trapezoidal intermediate portions 74 direct the varnish 82 through the slot 26 by capillary action. Additionally, the second varnish injector 84 applies the varnish directly onto the wires 24, and the varnish 82 flows onto the trapezoidal intermediate portions 74 from the wires 24. That is, because the trapezoidal intermediate portions 74 extend outside the slot, varnish 82 that would normally flow through the wires 24 and out of the stator core 22 is caught by the intermediate portions 74. The varnish 82 then flows along the trapezoidal intermediate portions 74 and into the slot 26. Because the insulating layer 70 is positioned out from the slot 26, the varnish injectors 80, 84 can be positioned farther away from the stator core 22, inhibiting varnish flow interruptions that can occur when the varnish injectors 80, 84 are too close to the surface of the stator core 22, thus improving varnish penetration.

Figure 6:
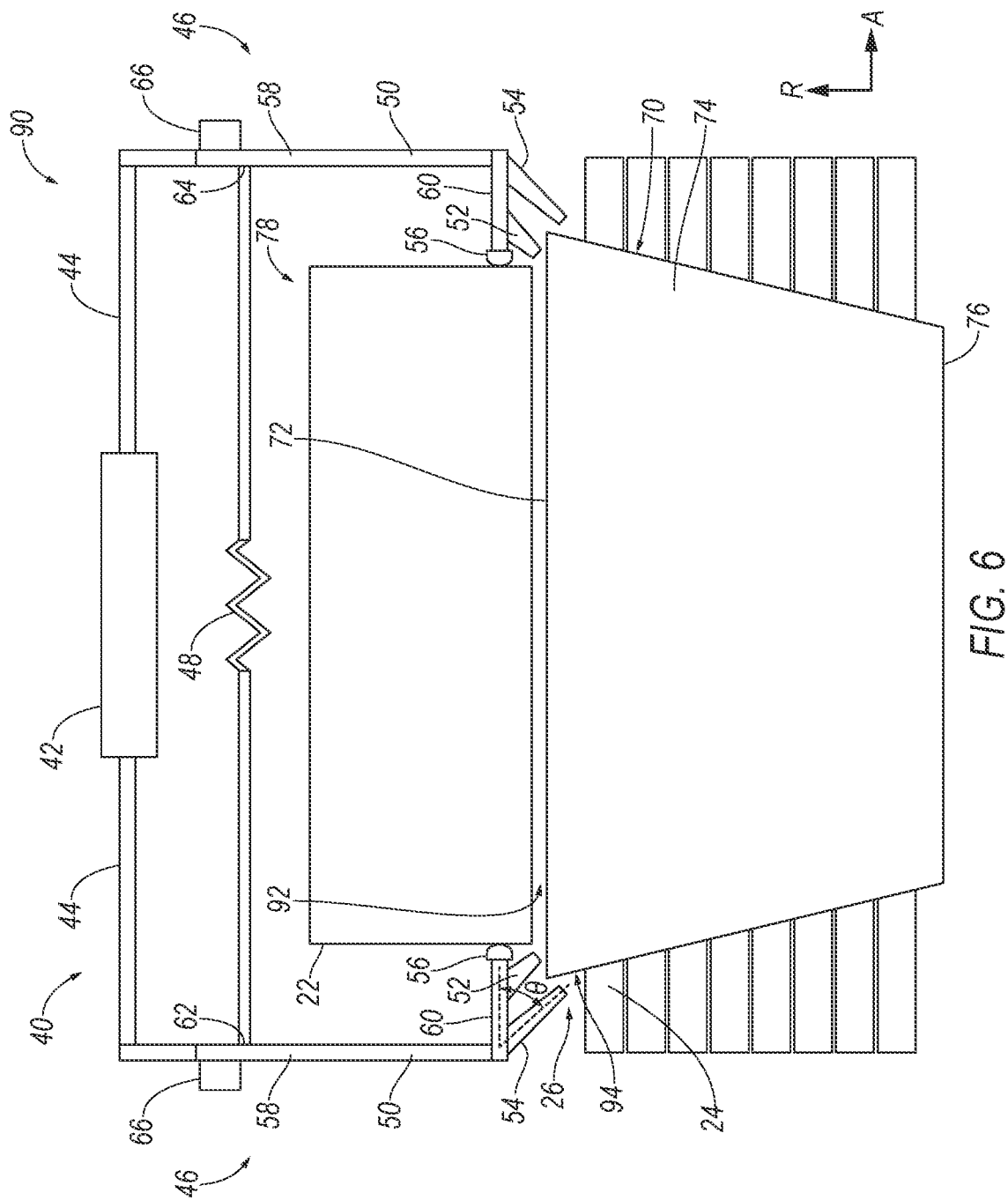
FIG. 6 is a side view of the varnish injection system of FIG. 3 applying varnish to the insulating layer of FIG. 4.

Now referring to FIG. 6, a motor assembly 90 includes the stator 78, the varnish injection system 40 as shown in FIG. 3, and the insulating layer 70 as shown in FIGS. 4-5. In this form, the trapezoidal portions 74 of the insulating layer 70 direct the varnish applied by the varnish injection nozzles 52, 54 through the slot 26. The varnish injection nozzles 52, 54 are arranged to apply varnish to the first and second gaps 92, 94 defined between the wires 24, the insulating layer 70, and the stator core 22. Specifically, as the varnish is applied to the first gap 92, the varnish is drawn into the slot 26 by the trapezoidal intermediate portions 74. Moreover, as the varnish is applied to the second gap 94 and the stator core 22 rotates, the varnish flows with the assistance of gravity onto the trapezoidal intermediate portions 74, which direct the varnish into the slot 26. Thus, varnish penetration is increased by use of both the varnish injection system 40 that positions the injector nozzles 52, 54 at the first and second gaps 92, 94 and the insulating layer 70 with the trapezoidal intermediate portions 74 that direct the varnish through the slot 26. It is within the scope of the disclosure to provide different combinations of the components described above to apply varnish to the wires according to the specific configuration of the stator.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase "at least one of A, B, and C" should be construed to mean a logical (A OR B OR C), using a non-exclusive logical OR, and should not be construed to mean "at least one of A, at least one of B, and at least one of C."

As used herein, the terms "first," "second," and other ordinal language are used as descriptors, and do not imply any specific order or importance.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A varnish injection system for an electric motor having a stator core and a plurality of wires arranged in and connected to the stator core, the system comprising:
   a pair of varnish injection assemblies, wherein each varnish injection assembly comprises:
   an injector arm, and
   a varnish injector nozzle attached to the injector arm and operable to provide a varnish to a gap defined between the stator core and one or more wires among the plurality of wires; and
   a biasing device connecting the pair of varnish injection assemblies and configured to exert a compressive force urging the pair of varnish injection assemblies toward each other.

2. The system of claim 1, wherein each varnish injection assembly of the pair of varnish injection assemblies further comprises a second varnish injector nozzle supported by the injector arm, wherein the second varnish injector nozzle is arranged adjacent to the varnish injector nozzle.

3. The system of claim 2, wherein, for at least one of the varnish injection assemblies from the pair of varnish injection assemblies, the varnish injector nozzle and the second varnish injector nozzle are arranged relative to one another to have the varnish injector nozzle provide varnish at a first portion of the gap and the second varnish injector nozzle provide varnish at a second portion of the gap different from the first portion of the gap.

4. The system of claim 1, wherein each varnish injection assembly further comprises a nub disposed over an end of the injector arm and configured to contact the stator core.

5. The system of claim 4, wherein each nub is formed of a resiliently deformable material.

6. The system of claim 4, wherein each nub has a length, the length determined to position each varnish injector nozzle at a specified distance from the gap when the nub contacts the stator core.

7. The system of claim 4, wherein the biasing device is configured to urge each nub onto the stator core.

8. The system of claim 1, wherein, for at least one varnish injection assembly from among the pair of varnish injection assemblies, the varnish injector nozzle and the injector arm are arranged relative to each one other to define an acute angle.

9. The system of claim 1, further comprising a varnish supply and a varnish pump, the varnish supply fluidly connected to the varnish pump and the varnish pump fluidly connected to the varnish injector nozzles.

10. The system of claim 1, wherein the injector arms are formed of a resilient material configured to elastically deform upon urging by the biasing device.

11. The system of claim 1, wherein the biasing device comprises a first end connected to the injector arm of one of the varnish injection assemblies and a second end connected to the injector arm of the other of the varnish injection assemblies.

12. The system of claim 1, wherein a first one of the pair of varnish injection assemblies is disposed on a first side of the stator core and a second one of the pair of varnish injection assemblies is disposed on an opposing second side of the stator core.

13. A stator for an electric motor, the stator comprising:
a stator core defining a slot;
a wire disposed in the slot; and
an insulating layer disposed in the slot between the stator core and the wire, the insulating layer comprising:
a rectangular portion adjacent to the stator core; and
a pair of trapezoidal intermediate portions extending away from the rectangular portion, wherein the pair of trapezoidal intermediate portions extend out from the slot with the wire, and wherein the pair of trapezoidal intermediate portions are in fluid communication with the slot such that the trapezoidal intermediate portions direct varnish into the slot by capillary action.

14. The stator of claim 13, wherein the trapezoidal intermediate portions extend continuously across the wire beneath a varnish nozzle disposed outside of the slot to direct varnish deposited by the varnish nozzle through the slot.

15. The stator of claim 13, wherein the insulating layer defines a first gap with the stator core and a second gap with the wire.

16. A motor assembly comprising:
a stator of an electric motor, the stator comprising:
a stator core defining a slot;
a wire disposed in the slot; and
an insulating layer disposed between the stator core and the wire, the insulating layer comprising:
a rectangular portion adjacent to the stator core; and
a pair of trapezoidal intermediate portions extending away from the rectangular portion, wherein the trapezoidal intermediate portions extend out from the slot with the wire,
wherein the stator core and the insulating layer define a first gap therebetween and the wire and the insulating layer define a second gap therebetween; and
a varnish injection system comprising:
a pair of varnish injection assemblies disposed on opposing sides of the stator core, wherein each varnish injection assembly comprises:
an injector arm,
a varnish injector nozzle attached to the injector arm and operable to provide a varnish to one of the first gap and the second gap, and
a varnish supply fluidly connected to the varnish injector nozzle, and
a biasing device connecting the pair of varnish injection assemblies and configured to exert a compressive force urging the pair of varnish injection assemblies toward each other.

17. The assembly of claim 16, wherein each varnish injection assembly of the pair of varnish injection assemblies further comprises a second varnish injector nozzle supported by the injector arm,
wherein the second varnish injector nozzle is arranged adjacent to the varnish injector nozzle,
wherein, for at least one of the varnish injection assemblies from the pair of varnish injection assemblies, the varnish injector nozzle and the second varnish injector nozzle are arranged relative to one another to have the varnish injector nozzle provide varnish at the first gap and the second varnish injector nozzle provide varnish at the second gap.

18. The assembly of claim 17, wherein the insulating layer is disposed between the varnish injector nozzle and the second varnish injector nozzle of at least one of the varnish injection assemblies.

19. The assembly of claim 16, wherein each varnish injection assembly further comprises a nub disposed over an end of the injector arm and configured to contact the stator core.

20. The assembly of claim 19, wherein the nubs are configured to urge the injector arms upon engaging deviations on a surface of the stator core.

* * * * *